United States Patent
Matsuda et al.

(10) Patent No.: US 7,118,460 B2
(45) Date of Patent: *Oct. 10, 2006

(54) FINISHING METHOD FOR STEPPING MOTOR STATOR STACK AND ROTOR STACK

(75) Inventors: Takae Matsuda, Kitasaku-Gun (JP); Takashi Toda, Kitasaku-Gun (JP); Noriyuki Yoshimura, Kitasaku-Gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/194,234

(22) Filed: Aug. 1, 2005

(65) Prior Publication Data

US 2005/0257359 A1    Nov. 24, 2005

Related U.S. Application Data

(63) Continuation of application No. 10/648,879, filed on Aug. 26, 2003, now Pat. No. 6,942,547.

(30) Foreign Application Priority Data

Aug. 26, 2002  (JP) .............................. 2002-244433

(51) Int. Cl.
*B24B 1/00* (2006.01)
*B23P 17/00* (2006.01)

(52) U.S. Cl. ........................ 451/47; 451/49; 29/421.1

(58) Field of Classification Search ................. 451/28, 451/38–40, 47, 49, 51; 29/421.1
See application file for complete search history.

(56) References Cited

U.S. PATENT DOCUMENTS

| 4,771,659 | A | * | 9/1988 | Schmolke | 451/40 |
| 5,964,644 | A | * | 10/1999 | Rhoades | 451/40 |
| 6,099,391 | A | * | 8/2000 | Suzuki et al. | 451/39 |
| 6,244,934 | B1 | * | 6/2001 | Miyai et al. | 451/38 |
| 6,622,685 | B1 | * | 9/2003 | Takahashi et al. | 123/193.2 |
| 6,920,683 | B1 | * | 7/2005 | Tanaka | 451/49 |
| 2003/0032369 | A1 | * | 2/2003 | Carpenter | 451/38 |

* cited by examiner

*Primary Examiner*—Hadi Shakeri
(74) *Attorney, Agent, or Firm*—Joel E. Lutzker, Esq.; Anna Vishev, Esq.; Schulte Roth & Zabel LLP

(57) ABSTRACT

A stepping motor stator stack and rotor stack finishing method whereby the burrs remaining on the small tooth surfaces of the stacks can be eliminated and prevented from lodging in the spaces between laminations of a plurality of stacked steel plates, without causing dulling of these small teeth. After abrasive finishing is carried out, a high pressure liquid jet spray nozzle is introduced into the central cylindrical cavity of a stator stack, and while the nozzle is moved along the central axis of the central cylindrical cavity and rotated relatively centered on the central axis of the central cylindrical cavity, the high pressure liquid jet is sprayed from the jet orifices striking the small tooth surfaces of the stator stack facing the central cylindrical cavity so as to remove the burrs remaining on the small tooth surfaces.

4 Claims, 7 Drawing Sheets

FINISHING METHOD FOR STEPPING MOTOR STATOR STACK AND ROTOR STACK

CROSS-REFERENCE TO RELATED APPLICATIONS

This application is a continuation of and claims all rights of priority to U.S. patent application Ser. No. 10/648,879, filed Aug. 26, 2003 now U.S. Pat. No. 6,942,547, which claims all rights of priority to Japanese Patent Application No. 2002-244433 filed on Aug. 26, 2002.

BACKGROUND OF THE INVENTION

The present invention relates to a finishing method for stepping motor stator stacks and rotor stacks, and more specifically to a finishing method for eliminating burrs, remaining on the small tooth surface of stator stacks and rotor stacks after abrasive finishing by means of a mechanical process, without loss of the original shape of the small teeth.

Stepping motor stators are formed by turning, stacking and laminating a plurality of magnetic steel plates formed with a plurality of magnetic pole parts at equal intervals oriented toward the central axis of the motor. Each of the plurality of magnetic pole parts in the steel plates has a plurality of small teeth formed at its tip at equal intervals in the direction of the circumference and oriented toward the central axis of the motor. Magnetic steel plates are laminated such that the plurality of small teeth have long, narrow protrusions and long, narrow grooves between adjacent protrusions.

In the process of forming or stamping a stator stack, typically accomplished by punching, a plurality of burrs and/or rough areas are created. Where a stator stack of this sort has only undergone an abrasive finishing by means of a mechanical process, these burrs or rough areas remain. Furthermore, after the plurality of magnetic steel plates have been turned, stacked and laminated, irregularities in the inside diameter are eliminated by means of stacking. However, processing burrs remain on the small tooth surfaces of each magnetic steel plate because of the honing process carried out to assure the roundness.

Conventional methods of eliminating these trimming burrs and processing burrs remaining on the small teeth of each of the laminated plates of the stator stack consisted of spraying beads from a blaster and brushing.

Unfortunately, these methods for removing burrs have multiple problems.

Specifically, using the method of spraying beads from a blaster it is difficult to uniformly eliminate the burrs remaining on the small tooth surfaces because of the orientation of the bead spray and the distance between the small teeth and the spray nozzle. Additionally, the removed burr dust and the beads fall into the spaces between the plural laminated steel plates and cannot easily be removed by cleaning. Subsequently, these removed burrs can cause poor rotation of the motor by lodging between the stator and the rotor.

Furthermore, in order to avoid a lack of uniformity during removal by brush abrasion using the brushing method, brushes must be moved back and forth in the direction of the small tooth stacks to remove the burrs. If the brush replacement frequency is not managed appropriately, removed burrs and abrasion dust from the brushes can lodge in the spaces between the plural laminated plates. Additionally, it is not easy to eliminate these particles through cleaning. Therefore, they can cause poor rotation of the motor by lodging between the stator and the rotor.

A stepping motor rotor stack is formed by laminating a plurality of round magnetic steel plates having a plurality of small teeth formed along the perimeter at equal intervals, the teeth being oriented toward the perimeter. By laminating a plurality of such magnetic steel plates, long, narrow protrusions are formed through the stacking, and long, narrow grooves are formed between adjacent protrusions.

Similarly to the stator stack, where a rotor stack has only undergone abrasive finishing by means of a mechanical process, burrs that arise in the process of punching for forming or stamping necessary shape in the magnetic steel plates remain in the finished product. Irregularities in an outer diameter of the rotor are typically eliminated in the process of lamination of the plurality of magnetic steel plates. However, processing burrs remain on the small tooth surfaces of each magnetic steel plate because of the grinding process carried out to assure the roundness.

Conventional methods of eliminating these trimming burrs and processing burrs remaining on the small teeth of each of the laminated plates of the rotor stack typically include spraying beads from a blaster, buffing and brushing.

Unfortunately, these methods for removing burrs have multiple problems.

More specifically and as mentioned above, the method of spraying beads from a blaster and the method of brushing have the same problems observed for these methods on stator stacks. Furthermore, when the buffing method is used, the components of the buffer become lodged in between the layers of the plural laminated steel plates and cannot be easily eliminated by cleaning. Subsequently, these removed burrs can cause poor rotation of the motor by lodging between the stator and the rotor. Even if elimination of these particles was possible, a great amount of time would be needed to do so.

As mentioned above, all of these conventional methods for eliminating trimming and processing burrs present problems. These burrs still remain on the small tooth surfaces of stepping motor stator stacks and rotor stacks that have been abrasively or finally finished by means of honing, grinding and other mechanical processes. Moreover, since all of these methods are ones where contact is made with the small teeth, difficulties arise in eliminating burrs without dulling these teeth. Other notable problems are having to suitably adjust and change the relative speed of rotation, the relative orientation of the motion of the jig, work-piece and adjusting the pressure used on the work-piece at the appropriate time. This results in difficulty in managing these working conditions and long processing time.

SUMMARY OF THE INVENTION

The present invention was conceived to solve the problems of the prior art described above and its object is to provide a finishing method for stepping motor stator stack and rotor stack that uniformly eliminates the burrs remaining on the small tooth surfaces of both stacks without causing dulling of the small teeth, and further prevents the removed burrs from lodging in the spaces in the laminates between the plural steel plates that form both stacks, prevents flying out during motor rotation and also lodging between the stator and rotor, therefore allowing for a proper rotation of the motor.

The present invention provides a finishing method for stepping motor stator stacks and rotor stacks that solves the problems previously mentioned. When the finishing process is carried out on stepping motor stators that have undergone abrasive finishing by means of a mechanical process to remove burrs, such as trimming burrs and processing burrs left on the small tooth surfaces after processing, a high pressure liquid jet spray nozzle is inserted into the central cylindrical cavity of the stator stack, and while the spray nozzle is moved along the central axis of the central cylindrical cavity and rotated centered on the central axis of this cavity, the high pressure liquid jet sprayed from the jet orifices of this spray nozzle faces the central cylindrical cavity and hits the small tooth surfaces of the stator stack.

The trimming and processing burrs can be effectively dislodged, propelled from the surface and removed by the strong force of impact of this high pressure liquid jet. Furthermore, the waste, oils, metal dust and crystalline material adhering to the small teeth can be effectively blown away and the small teeth cleaned. Also, since there is nothing to cause dulling of the small teeth, there is no fear of distorting the motor rotational characteristics.

The above advantages and features are of representative embodiments only. It should be understood that they are not to be considered limitations on the invention as defined by the claims. Additional features and advantages of the invention will become apparent in the following description and from the claims.

BRIEF DESCRIPTION OF THE DRAWINGS

A full understanding of the invention can be gained from the following description of the preferred embodiments when read in conjunction with the accompanying drawings in which.

DETAILED DESCRIPTION

This invention solves the problems of prior art by providing a stepping motor stator stack and rotor stack finishing method that uniformly eliminates the burrs remaining on the small tooth surfaces of both stacks.

Figure 1:
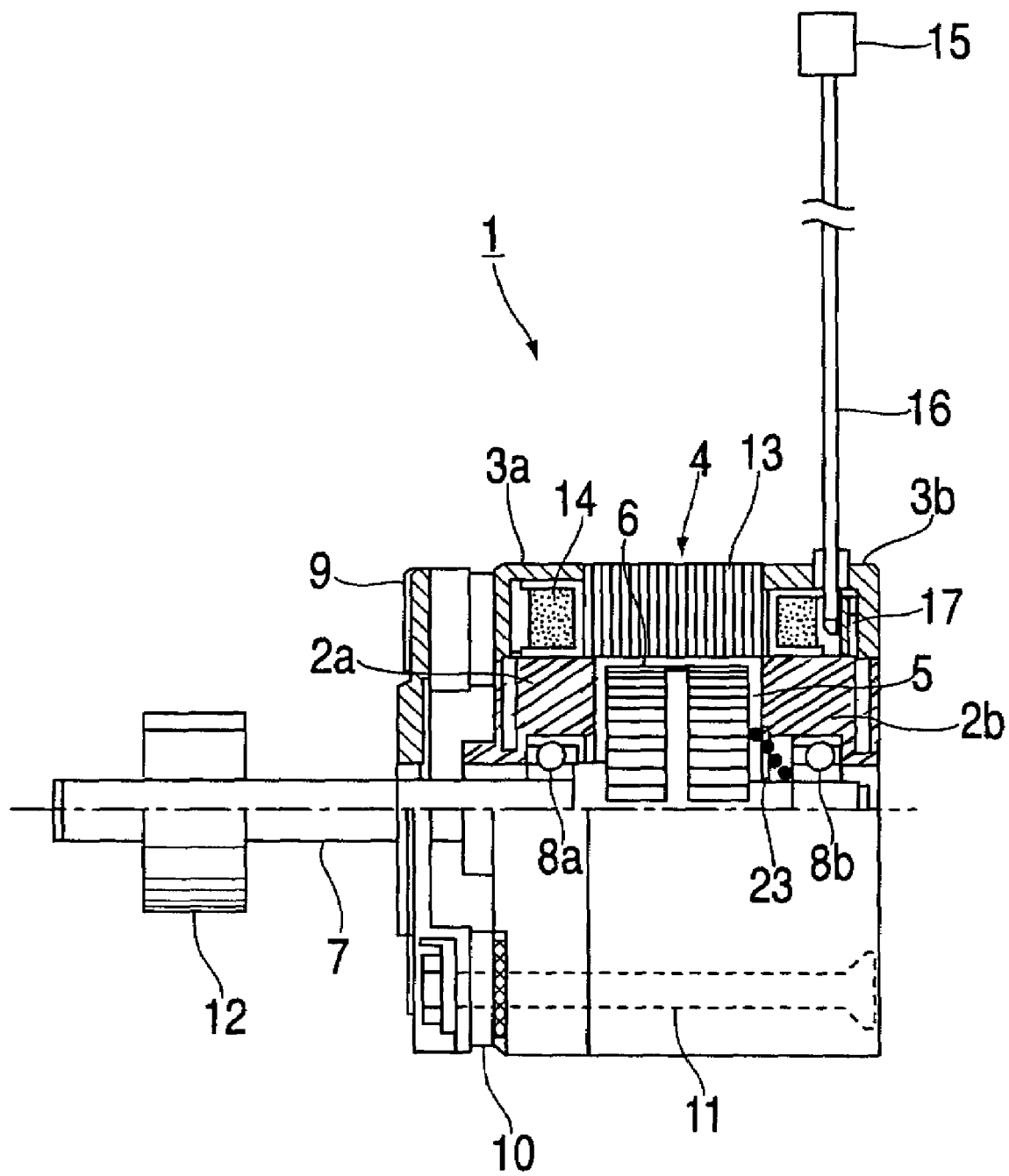
FIG. 1 is a vertical cross sectional view of the upper half and side view of the lower half of a stepping motor stator stack being finished using the finishing method according to a first embodiment of the present invention.

In accordance with a first embodiment of the present invention, in the stepping motor 1, the stator stack 4 is held between a front flange 3a and a rear flange 3b, each of which is cast as a unit with a front mold 2a and a rear mold 2b, respectively, which are a part of the walls on each end in the axial orientation, as is shown in FIG. 1. A rotor stack 6 is housed in the central cylindrical cavity 5 of stator stack 4 which is formed by the front and rear molds 2a and 2b and the stator stack 4. Shaft 7 rotating the rotor stack 6 is inserted through two round holes in the front and rear molds 2a and 2b and is supported by front and rear bearings 8a and 8b.

In front of the front flange 3a, a protective plate 9 is attached through bushing 10. The front and rear flanges 3a and 3b, the stator stack 4 and the protective plate 9 are solidly connected by bolts 11 through their four corners and assembled into a unit. The rotating shaft 7 extends outside the protective plate 9, and the output of the stepping motor 1 is transferred to the load side through a gear 12 affixed to the shaft.

Figure 3:
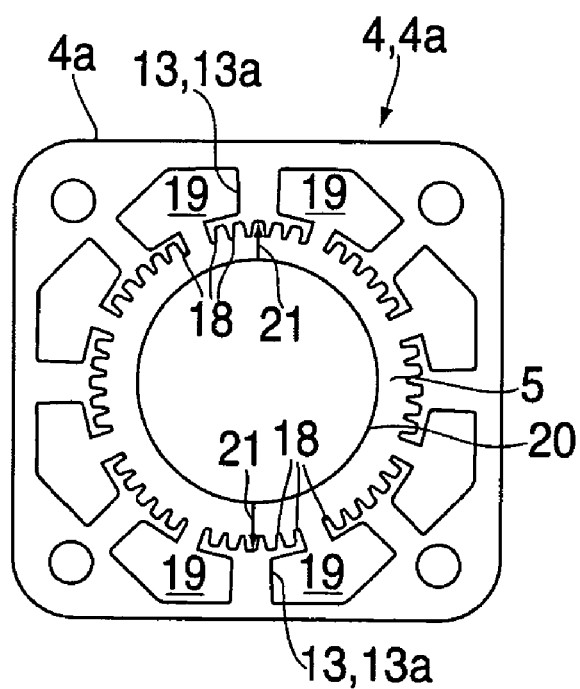
FIG. 3 is a frontal view of the stator stack of FIG. 1 and a frontal view of one of the stacked steel plates forming the stator stack, showing the state where finishing is being carried out.
Figure 4:
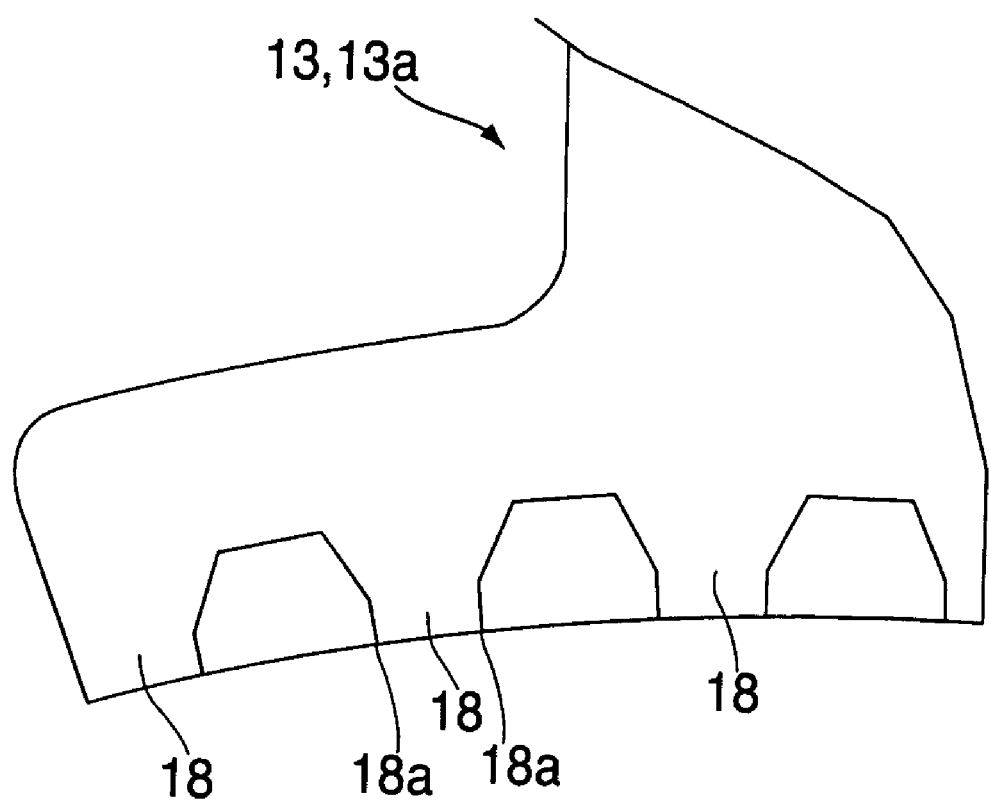
FIG. 4 is an enlargement of part of FIG. 3, showing the detailed structure of the small tooth part of one of the stacked steel plates forming the stator stack.

Plurality of magnetic poles 13, shown in FIGS. 1 and 3, on the stator stack 4 are wound with magnetic field windings 14. A controlled electric current is supplied to these magnetic field windings through connectors 15, leads 16 and a control circuit 17. A coil spring 23 is disposed between the rotor stack 6 and the rear bearing 8b, such that the rotor stack 6 always generates a rotational force by means of the launching force of the coil spring 23.

The structure of the stator 4 will be described in further detail.

As shown in FIGS. 1 to 4, the stator stack 4 is formed by turning, stacking and laminating a plurality of steel plates 4a made from a magnetic material. A plurality of T-shaped magnetic pole parts 13a are formed at equal intervals around the circumference of an inner opening of each plate 4a, the poles being oriented toward the central axis, that is, the axis of the rotating shaft 7. A plurality of small teeth 18 are oriented toward the central axis of the stepping motor 1 and formed at equal intervals around the circumference on the wide part of the head of the T on each of the plurality of magnetic pole parts on these laminated steel plates 4a.

These plural magnetic pole parts 13a are stacked and form a T-shaped magnetic pole 13 as viewed straight from the front through the laminating of a plurality of these stacked steel plates 4a. A space 19 is formed for wrapping the magnetic field windings 14 between adjacent magnetic poles 13 and 13a. Furthermore, by laminating a plurality of these stacked steel plates 4a, the plurality of small teeth 18 are stacked up forming long, narrow, straight protrusions and long, narrow grooves between adjacent protrusions.

Trimming burrs arise in the process of punching for forming the described shape of each stacked steel plate in order to assemble the stator stack 4. Stator stack 4 assembled in this manner undergoes an abrasive finishing by means of mechanical processing. However, the trimming burrs remain after the abrasive finishing is completed. Furthermore, after a plurality of these stacked steel plates 4a has been turned, stacked and laminated, processing burrs arise on the peripheral edges of the small teeth 18 of each of the stacked steel plates 4a because of the honing process performed to eliminate irregularities in the dimensions of the inside diameter. Therefore, in order to remove these trimming burrs and processing burrs that remain on the small tooth surfaces of each of the stacked steel plates 4a of the stator stack 4, the stator stack 4 finishing method described in the following paragraphs is implemented in the first embodiment.

Figure 2:
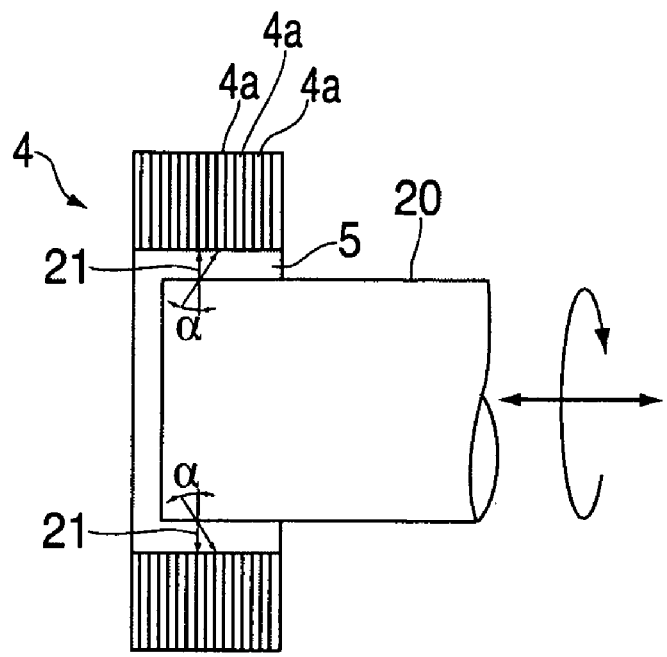
FIG. 2 is a vertical cross sectional view of the stator stack of FIG. 1 showing the state where finishing is being carried out.

More specifically, as shown FIGS. 2 and 3, in this finishing method, a high pressure liquid jet spray nozzle 20 is introduced into the central cylindrical cavity 5 of the stator stack 4 which has undergone abrasive finishing by means of a mechanical process, such as honing or grinding. While this high pressure liquid jet spray nozzle 20 is moved approximately along the central axis of the central cylindrical cavity 5 and rotated relatively around the central axis of the central cylindrical cavity 5, the high pressure liquid jet 21 is sprayed from the two jet orifices on opposite sides of the high pressure liquid jet spray nozzle 20 striking the small tooth surfaces of each stacked plate 4a of the stator stack 4 facing the central cylindrical cavity 5, thus removing any burrs remaining on these small tooth surfaces.

Burrs, such as trimming burrs and processing burrs, that remain on the surfaces on the peripheral edges of the small teeth 18 of each stacked steel plate 4a are sprayed from the jet orifices of the high pressure liquid jet spray nozzle 20. The strong force of impact of the high pressure liquid jet 21, which is set to an appropriate pressure, effectively dislodges the burrs, propels them from the surface and removes them from the small teeth 18. Furthermore, the waste, oil, metal dust and crystalline material adhering to the small tooth surfaces can be effectively blown away and the tooth surfaces cleaned. Since there is no cause of dulling, particularly of the angles of the parts 18a of the small teeth 18 where both angles are punched at approximately right angles (see FIG. 4), there is no fear of distortion in the motor rotation characteristics such as torque, angular precision, hysteresis characteristics, vibration and response frequency. In fact, improvements in such characteristics are frequently observed.

By carrying out this finishing process on stator stacks 4 of stepping motor 1, the finishing process can be performed using a comparatively simple method with a reduced work time. It is also possible to provide a good finishing without creating poor rotation of the motor 1 which is a common result when the removed burrs, etc., lodged between the laminates of the plural stacked steel plates 4a that form the stack 4, fly out during motor 1 rotation and lodge in between the stator and the rotor.

In order to move and rotate the high pressure liquid jet spray nozzle 20 and the stator stack relative to each other, it is acceptable to hold the stator stack 4 in a jig and then move and rotate it. It is further acceptable to rotate the high pressure liquid jet spray nozzle 20 and move the stator stack 4 or do the reverse.

Furthermore, the orientation of the high pressure liquid jet 21 is perpendicular to the axis of the high pressure liquid jet spray nozzle 20 therefore perpendicular to the central axis of the center cylindrical cavity 5. However, it is also acceptable for it to be slanted at a certain angle α (see the dashed line in FIG. 2). Such a method prevents the high pressure liquid jet 21 from being forced into the spaces between each of the layers in the plurality of stacked steel plates 4a and from making these spaces larger due to the strong force of impact, and therefore prevents the dislodged burrs, etc., from easily entering the spaces in the laminates. Furthermore, if the orientation of the spray of the high pressure liquid jet 21 is toward the trimming burrs in particular, the burrs can be easily removed.

Moreover, the number of jet orifices on the high pressure liquid jet spray nozzle 20 is not limited to a particular number. One jet orifice will suffice, however, when there are a plurality of jet orifices in accordance with the number of magnetic poles 13, all of the small tooth surfaces can be finished and cleaned at the same time, uniformly and instantly with just a relative rotation of the high pressure liquid jet spray nozzle 20. In such a manner, it is possible to improve work efficiency and obtain good finishing. Furthermore, if there is an even number of jet orifices in point symmetry in this case, the reactive motion of the jet spray is balanced, and the work can be performed with even greater efficiency.

Water is normally used for the high-pressure liquid jet 21, but purified water may be used instead of usual tap water. When purified water is used, the need to further clean the stator stack 4 in order to remove the spray liquid after finishing is eliminated. Consequently, there is no buildup, corrosion or clogging of the high pressure liquid jet spray nozzle 20 and the high pressure pipes due to various ions and impurities contained in the tap water. As such, prevention of rust after finishing is also possible.

According to experiments, using water for the high pressure liquid jet 21 with a high pressure liquid jet spray nozzle 20 having a jet orifice diameter of 0.10–0.25 mm, a spray pressure of 500–1500 $kgf/cm^2$, a stator stack rotation of 240 rpm, a speed of 1 mm/s for the speed of movement of the high pressure liquid jet spray nozzle 20, a distance of approximately 2 mm between the high pressure liquid jet spray nozzle 20 and the stator stack 4, a spray orientation for the high pressure liquid jet 21 being perpendicular to the central axis of the central cylindrical cavity 5 and having the high pressure jet spray nozzle 20 making one pass back and forth; good finishing with removal of the burrs remaining on the small tooth surfaces was obtained. In addition, there was no dulling of the small teeth 18.

Figure 5:
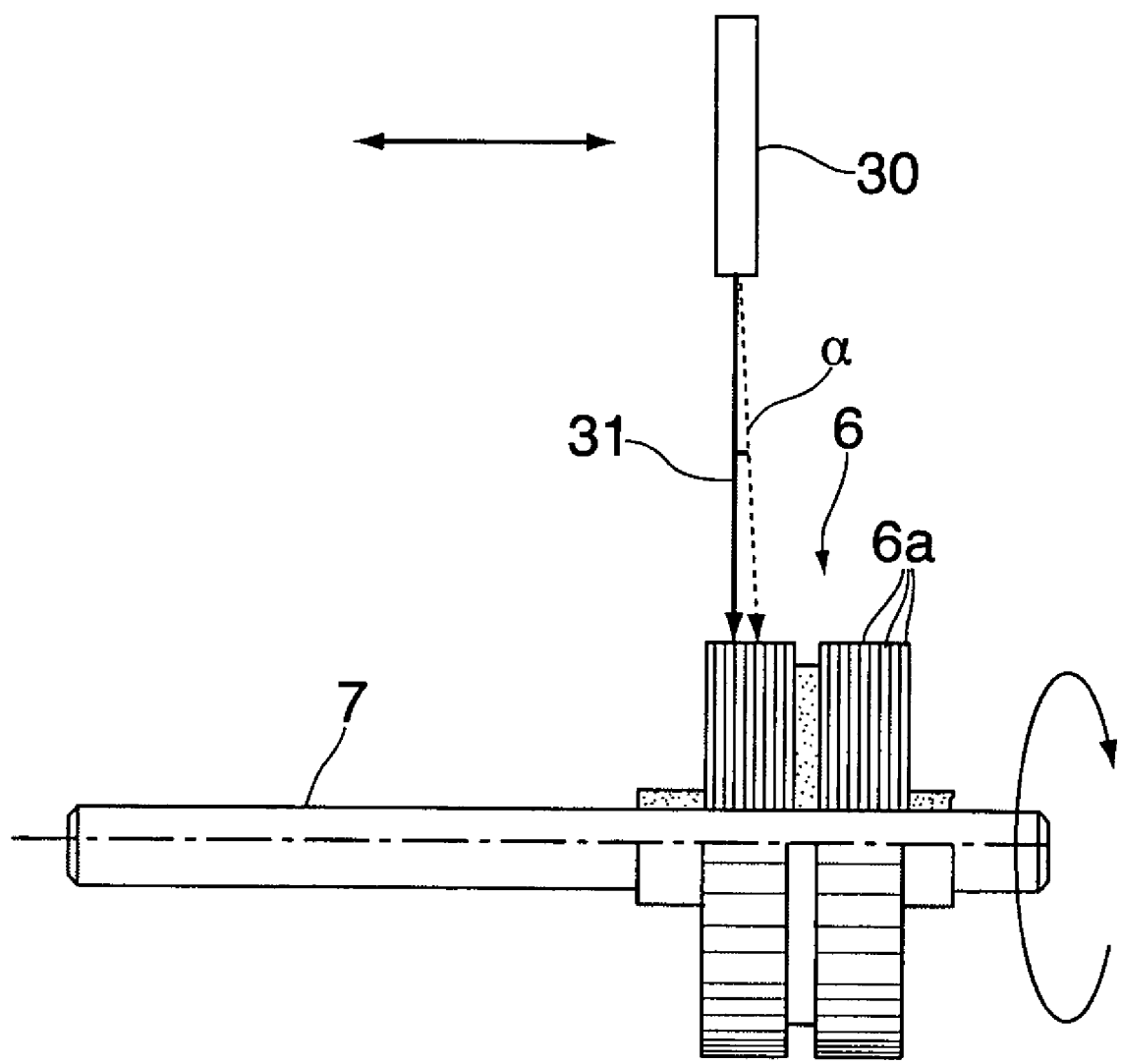
FIG. 5 is a vertical cross sectional view of the upper half and side view of the lower half of a stepping motor rotor stack being finished using the finishing method according to a second embodiment of the present invention.
Figure 6:
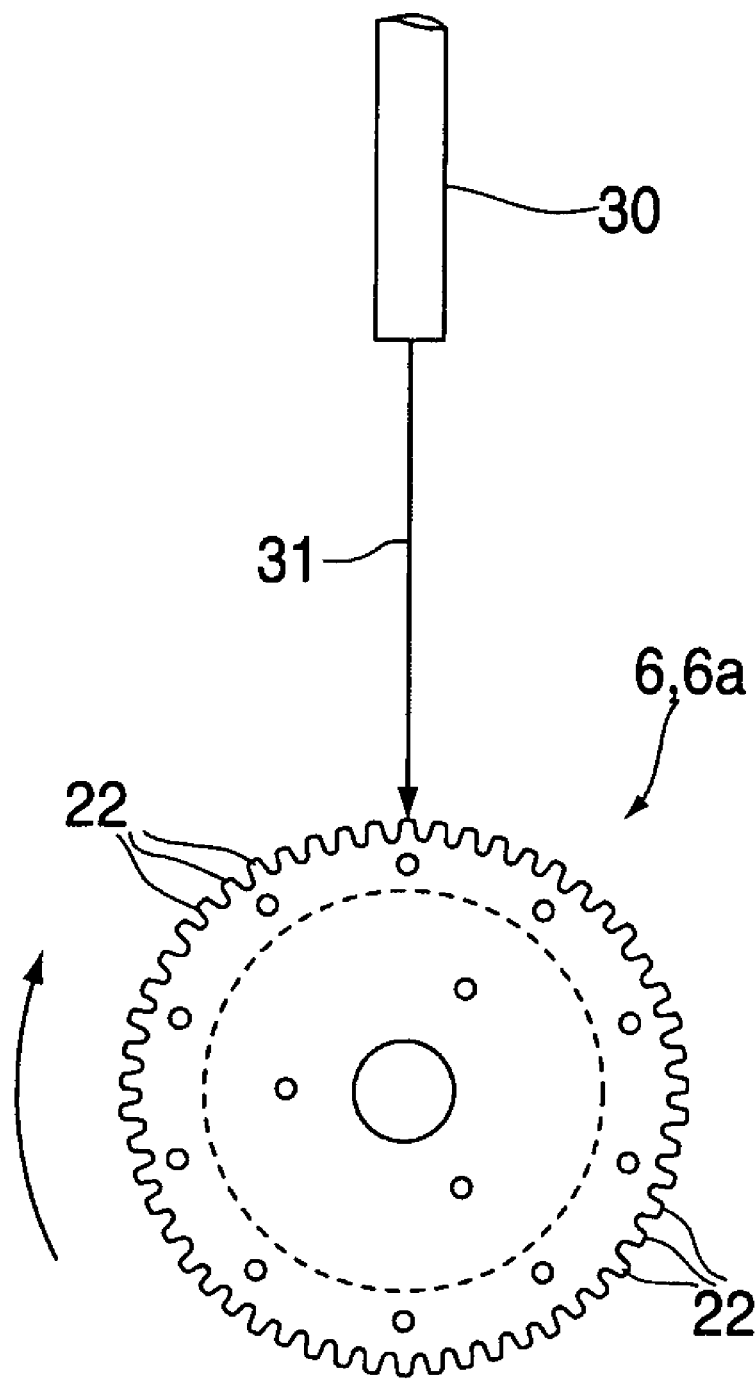
FIG. 6 is a frontal view of the rotor stack of FIG. 5 and a frontal view of one of the stacked steel plates forming the rotor stack, showing the state where finishing is being carried out.

In accordance with a second embodiment of the present invention, as shown in FIGS. 5 and 6, the finishing method for the rotor stack 6 is provided, where the rotor stack is formed by laminating a plurality of steel plates 6a made from disks of magnetic material with a plurality of small teeth 22 formed at equal intervals around an outside perimeter of each plate 6a. Long narrow protrusions are formed by stacking a plurality of these small teeth 22 by means of laminating a plurality of the stacked steal plates 6a, and long narrow grooves are formed between adjacent protrusions.

In a rotor stack 6 assembled in this manner and undergone abrasive finishing by means of mechanical processing, the trimming burrs that arise in the process of punching for forming this shape in the stacked steel plates remain after the abrasive finishing is completed. Furthermore, after a plurality of these stacked steel plates 6a has been laminated, processing burrs arise on the peripheral edges of the small teeth 22 of each of the stacked steel plates 6a because of the grinding process performed to eliminate irregularities in the dimensions of the outside diameter. Therefore, in order to remove these trimming burrs and processing burrs that remain on the small tooth surfaces of each of the stacked steel plates 6a of the rotor stack 6, the rotor stack 6 finishing method described in the following paragraphs is implemented in the second embodiment.

More specifically, as shown in FIGS. 5 and 6, in this finishing method, high pressure liquid jet spray nozzle 30 is moved back and forth relative to the rotor stack 6 along the central axis of the aforementioned rotor stack 6 which has undergone abrasive finishing by means of a mechanical process. While this high pressure liquid jet spray nozzle 30 is moved approximately along the central axis of the rotor stack 6 and rotated relative to the rotor stack 6, the high pressure liquid jet 31 is sprayed from the jet orifice on the high pressure liquid jet spray nozzle 30 striking the small tooth surfaces from directly above the small teeth 22 of the rotor stack 6, thus removing any remaining burrs.

Burrs, such as trimming burrs and processing burrs, that remain on the surfaces on the peripheral edges of the small teeth 22 of each stacked steel plate 6a are sprayed from the jet orifices of the high pressure liquid jet spray nozzle 30.

Figure 8:
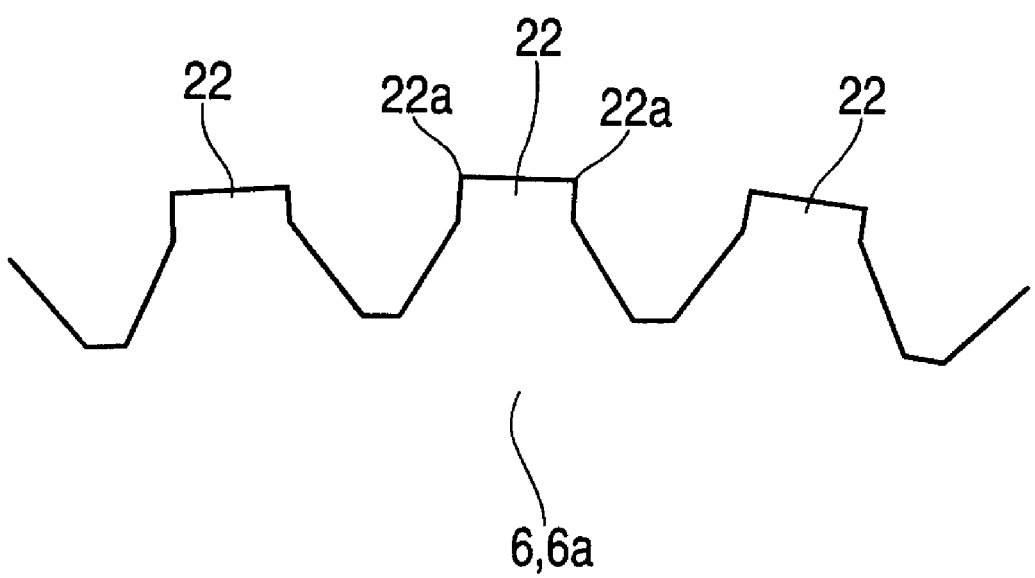
FIG. 8 is an enlargement of part of FIG. 6, showing the detailed structure of the small tooth part of one of the stacked steel plates forming the rotor stack.

The strong force of impact of the high pressure liquid jet 21, which is set to an appropriate pressure, effectively dislodges the burrs, propels them from the surface and removes them from the small teeth 22. Furthermore, the waste, oil, metal dust and crystalline material adhering to the small tooth surfaces can be effectively blown away and the tooth surfaces cleaned. Since there is no cause of dulling, particularly of the angles of the parts 22a of the small teeth 18 where both angles are punched at approximately right angles (see FIG. 8), there is no fear of distortion in the motor rotation characteristics, such as torque, angular precision, hysteresis characteristics, vibration and response frequency. In fact, improvements in such characteristics are frequently observed.

By carrying out this finishing process on rotor stacks 6 of stepping motor 1, the finishing process can be performed using a comparatively simple method with a reduced work time. It is also possible to provide a good finishing without creating poor rotation of the motor 1, which typically happens when the removed burrs, etc., lodged between the laminates of the plural stacked steel plates 6a that form the stack 6, fly out during motor 1 rotation and lodge in between the stator and the rotor.

In order to move and rotate the high pressure liquid jet spray nozzle 30 and the rotor stack 6 relative to each other, it is acceptable to hold the rotor stack 6 in a jig and then move and rotate it. It is further acceptable to move the high pressure liquid jet spray nozzle 30 and rotate the rotor stack 6 (see FIG. 5) or do the reverse.

Furthermore, the orientation of the high pressure liquid jet 31 spray is preferably perpendicular to the axis of the rotor stack 6. However, it is also acceptable for it to be slanted at a certain angle α (see the dashed line in FIG. 5). Such a method prevents the high pressure liquid jet 21 from being forced into the spaces between each of the layers in the plurality of stacked steel plates 6a and from making these spaces larger due to the strong force of impact, and therefore prevents the dislodged burrs, etc., from easily entering the spaces in the laminates.

However, the positions where the high-pressure liquid jet 31 strikes the rotor stack 6 small teeth 22 may be changed as follows.

Figure 7:
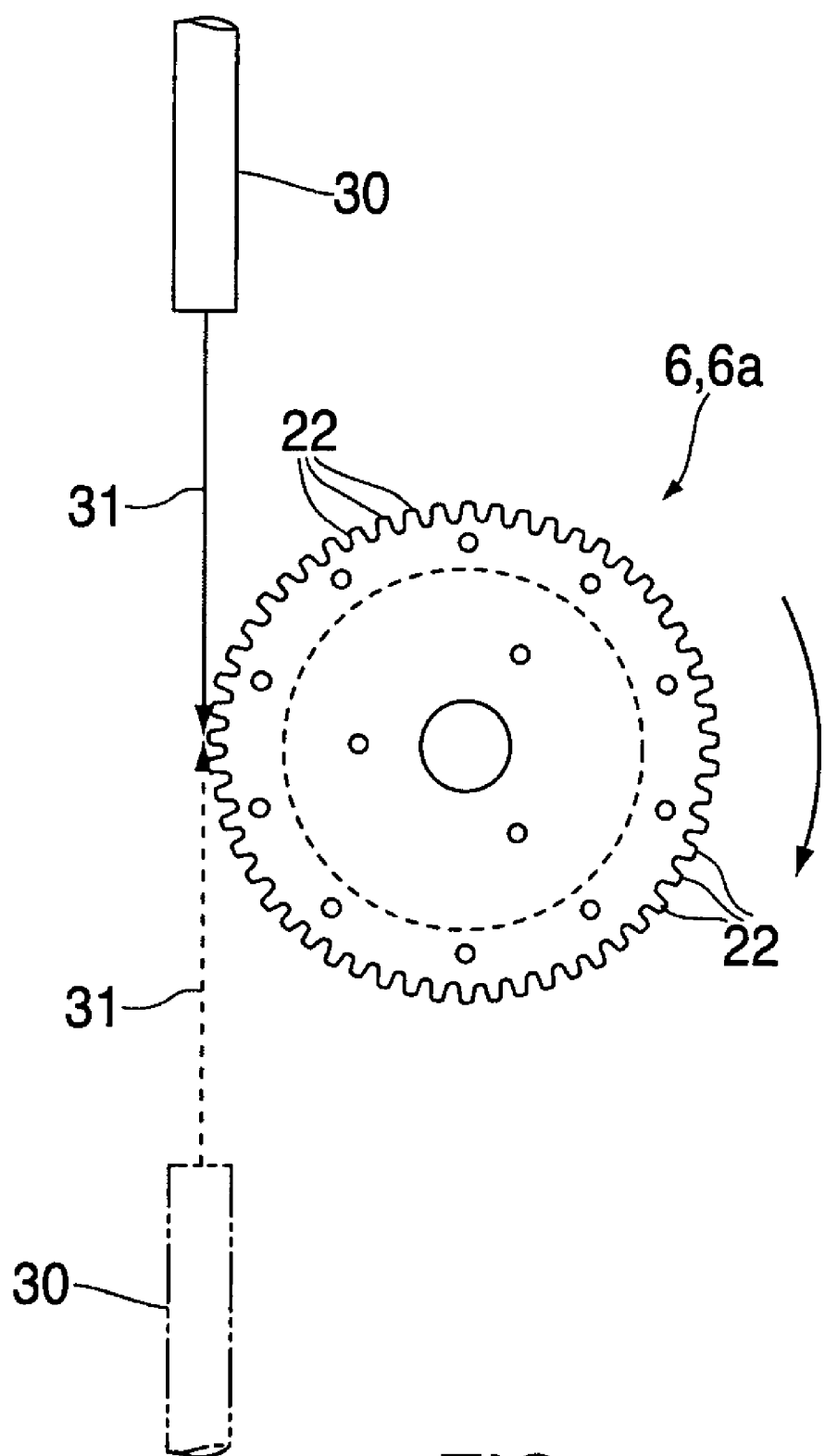
FIG. 7 is an example of a variation of FIG. 6.

The high pressure liquid jet 31 sprayed from the high pressure liquid jet spray nozzle jet orifice may be oriented tangentially to the rotor stack 6 as shown in FIG. 7 striking the small tooth surfaces of the rotor stack from the side. In such a case, it is desirable if the small teeth 22 are struck from the opposite direction (see the dashed lines in FIG. 7) because the burr removal is more effective. In such a case the relative movement and rotation of the high pressure liquid jet spray nozzles 30 and the rotor stack 6 are the same as in the case shown in FIGS. 5 and 6.

According to experiments, using water for the high pressure liquid jet 31 with a high pressure liquid jet spray nozzle 30 having a jet orifice diameter of 0.25–0.40 mm, a spray pressure of 500–1500 kgf/cm$^2$, a rotor stack rotation of 240 rpm, a speed of 1 mm/s for the speed of movement of the high pressure liquid jet spray nozzle 30, a distance of approximately 30 mm between the high pressure liquid jet spray nozzle 30 and the rotor stack 6, a spray orientation for the high pressure liquid jet 31 being perpendicular to the central axis of the rotor stack and having the high pressure jet spray nozzle 30 make one pass back and forth, good finishing with removal of the burrs remaining on the small tooth surfaces was obtained. In addition, there was no dulling in the small teeth 22.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A finishing method to remove burrs for stepping motor rotor stacks, each of said rotor stacks having a central axis and tooth surfaces, said method comprising steps of:
   moving a high pressure liquid jet spray nozzle for spraying a high pressure liquid jet substantially parallel to said central axis of said rotor stack while rotating said rotor stack substantially around said central axis of said rotor stack; and
   smoothing said tooth surfaces of said rotor stack by spraying said high pressure liquid jet onto said tooth surfaces of said rotor stack such that said burrs remaining on said tooth surfaces are removed.

2. The finishing method to remove burrs for stepping motor rotor stacks according to claim 1, wherein said high pressure liquid jet is inclined in a direction orthogonal to said central axis of said rotor stack.

3. The finishing method to remove burrs for stepping motor rotor stacks according to claim 1, wherein said high pressure liquid jet is pure water.

4. The finishing method to remove burrs for stepping motor rotor stacks according to claim 1, wherein said high pressure liquid jet is oriented in a direction tangential to a peripheral surface of said rotor stack.

* * * * *